United States Patent
Andrzejewski et al.

(10) Patent No.: US 11,780,323 B1
(45) Date of Patent: Oct. 10, 2023

(54) FUEL TANK VENTING SYSTEM WITH LIQUID COLLECTION AND ACTIVE PURGING

(71) Applicant: GM GLOBAL TECHNOLOGY OPERATIONS LLC, Detroit, MI (US)

(72) Inventors: Jason M. Andrzejewski, Washington, MI (US); Timothy E. McCarthy, Grand Blanc, MI (US); Marvin H. Miller, Flushing, MI (US); Clifford A. Lyons, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/834,313

(22) Filed: Jun. 7, 2022

(51) Int. Cl.
*B60K 15/00* (2006.01)
*B60K 15/035* (2006.01)

(52) U.S. Cl.
CPC .. *B60K 15/03519* (2013.01); *B60K 15/03504* (2013.01); *B60K 2015/03514* (2013.01)

(58) Field of Classification Search
CPC ........ B60K 15/03519; B60K 15/03504; B60K 15/03514
See application file for complete search history.

(56) References Cited

U.S. PATENT DOCUMENTS

| | | | | |
|---|---|---|---|---|
| 5,070,849 A * | 12/1991 | Rich | ....................... | F04B 23/14 123/514 |
| 5,979,485 A * | 11/1999 | Tuckey | .............. | F02M 37/0058 137/574 |
| 7,861,695 B2 * | 1/2011 | Althof | .................. | B60K 15/077 123/518 |
| 2002/0074059 A1 * | 6/2002 | Schaefer | .......... | B60K 15/03519 141/325 |
| 2002/0083983 A1 * | 7/2002 | Coha | .................. | F02M 37/0094 137/565.22 |
| 2003/0205272 A1 * | 11/2003 | Benjey | .................. | F16K 24/042 137/202 |
| 2004/0154596 A1 * | 8/2004 | Mitani | .................... | F02M 25/08 73/114.39 |
| 2004/0177886 A1 * | 9/2004 | Nagata | ................. | F02M 37/025 137/571 |
| 2004/0200460 A1 * | 10/2004 | Mitani | ............... | F02M 25/0818 73/40 |
| 2008/0223865 A1 * | 9/2008 | Althof | .................. | B60K 15/077 220/749 |
| 2019/0353121 A1 * | 11/2019 | Mills | .................. | F02M 25/0836 |
| 2021/0148309 A1 * | 5/2021 | Villaire | ............ | B60K 15/03504 |
| 2022/0260041 A1 * | 8/2022 | Mills | .................. | F02M 25/089 |
| 2022/0349525 A1 * | 11/2022 | Allinson | .................... | F17C 7/02 |

* cited by examiner

Primary Examiner — Phutthiwat Wongwian
Assistant Examiner — Sherman D Manley

(57) ABSTRACT

A fuel tank system includes a fuel tank and a fuel pump assembly arranged in the fuel tank and including a fuel pump and a vacuum source. A fuel tank venting system includes a first vent valve arranged in the fuel tank. A storage vessel is arranged in the fuel tank and in fluid communication with the first vent valve. A first fluid line arranged in the fuel tank connecting the storage vessel to the vacuum source of the fuel pump assembly. A second fluid line connects the storage vessel to an evaporative emission system.

20 Claims, 3 Drawing Sheets

FUEL TANK VENTING SYSTEM WITH LIQUID COLLECTION AND ACTIVE PURGING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to fuel tank venting systems for vehicles.

Fuel tanks rely on a liquid trap in a fuel tank venting system to capture fuel that has bypassed fuel tank vent valves. Purge air flow gradually evaporates the captured fuel. Sometimes the fuel in the fuel tank venting system exceeds the capacity of the liquid trap or escapes the liquid trap due to rough roads or vehicle maneuvers. When these conditions occur, the fuel can damage components located downstream, cause drivability/stall events, and/or excessive emissions.

SUMMARY

A fuel tank system includes a fuel tank and a fuel pump assembly arranged in the fuel tank and including a fuel pump and a vacuum source. A fuel tank venting system includes a first vent valve arranged in the fuel tank. A storage vessel is arranged in the fuel tank and in fluid communication with the first vent valve. A first fluid line arranged in the fuel tank connecting the storage vessel to the vacuum source of the fuel pump assembly. A second fluid line connects the storage vessel to an evaporative emission system.

In other features, the first vent valve is connected by a third fluid line to the storage vessel. A second vent valve is arranged in the fuel tank and in fluid communication with the storage vessel. A third fluid line connects the first vent valve to the storage vessel. A fourth fluid line connects the second vent valve to one of the first vent valve and the storage vessel.

In other features, the first vent valve comprises one of a fuel limit vent valve and a grade vent valve. The first vent valve comprises a grade vent valve and the second vent valve comprises a fuel limit vent valve. The first vent valve and the second vent valve are connected in series to the storage vessel. The first vent valve and the second vent valve are connected in parallel to the storage vessel. The storage vessel is mounted adjacent to an upper surface of the fuel tank. The storage vessel is mounted adjacent to a lower surface of the fuel tank. A one-way check valve connected between the first vent valve and the storage vessel. A fuel filter connected between the storage vessel and the vacuum source.

A fuel tank venting system includes a first vent valve arranged in a fuel tank and a second vent valve arranged in the fuel tank. A storage vessel is arranged in the fuel tank and connected in one of series and parallel to the first vent valve and the second vent valve. A first fluid line connects the storage vessel to a vacuum source of a fuel pump assembly. A second fluid line connects the storage vessel to an evaporative emission system.

In other features, a third fluid line connects the first vent valve to the storage vessel. A fourth fluid line connects the second vent valve to one of the first vent valve and the storage vessel. The first vent valve comprises a grade vent valve and the second vent valve comprises a fuel limit vent valve. The first vent valve and the second vent valve are connected in series to the storage vessel. The first vent valve and the second vent valve are connected in parallel to the storage vessel. The storage vessel is mounted one or adjacent to an upper surface of the fuel tank and adjacent to a lower surface of the fuel tank. A one-way check valve is connected between the first vent valve and the storage vessel. A fuel filter is connected between the storage vessel and the vacuum source.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to a fuel tank venting system for a fuel tank that includes a storage vessel that is actively drained or purged during operation of the fuel pump. The storage vessel captures liquid fuel from one or more vent valves in the fuel tank. The fuel from the vent valves occurs due to leakage or failure. The captured fuel in the storage vessel is emptied back into the fuel tank. The fuel tank venting system protects an emissions system of the vehicle from liquid fuel exposure and increased evaporative emissions. The fuel tank venting system also protects the engine from stall conditions due to bursts of raw fuel or rich vapor from the evaporative emission system.

The fuel tank venting system according to the present disclosure uses a storage vessel that acts as a trap to capture fuel prior the fuel entering the fuel tank venting system or the evaporative emission system located externally from the fuel tank. The fuel tank venting system actively drains or purges fuel captured in the storage vessel back into the fuel stored in the fuel tank when the fuel pump is energized.

Figure 1A:
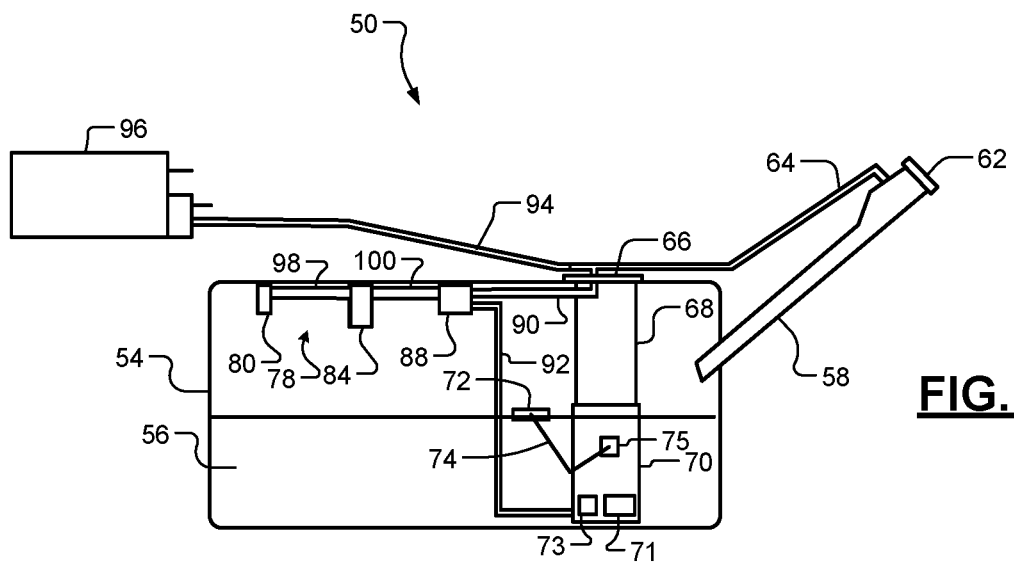
FIG. 1A is a functional block diagram of an example of a fuel tank venting system according to the present disclosure.

Referring now to FIG. 1A, a fuel tank 54 stored fuel 56 and includes a fuel tank venting system 50. The fuel tank 54 includes a fuel filler tube 58 that extends outwardly from the fuel tank 54. In some examples, a cap 62 may be used to cover an end of the fuel filler tube 58. In some examples, a fluid line 64 is connected near the cap 62 to capture fluid (liquid or vapor fuel) and extends to a flange plate 66 arranged on a top surface of the fuel tank 54.

Rods 68 are connected between the flange plate 66 and a fuel pump assembly 70 to position the fuel pump assembly adjacent to a bottom surface of the fuel tank 54. Alternately, the fuel pump assembly can be mounted to the bottom surface. The fuel pump assembly 70 includes a housing and a fuel pump 71 including a primary inlet and a secondary inlet providing a vacuum source 73. A float 72 is connected by a rod 74 to a level sensor 75 to sense a fuel level in the fuel tank.

One or more vent valves 78 are connected in the fuel tank 54 and fluidly connected by one or more fluid lines to a storage vessel 88. A lower portion of the storage vessel 88 is connected by a fluid line 92 to the vacuum source 73. An upper portion of the storage vessel 88 is connected by fluid lines 90 and 94 through the flange plate 66 to an evaporative emissions system 96 external to the fuel tank 54. In some examples, the evaporative emissions system 96 includes a carbon canister. The fluid line 64 is connected by the fluid line 94 to the evaporative emissions system 96.

The one or more vent valves 78 may include a fuel limit vent valve (FLW) 80, a grade vent valve (GW) 84, a roll over valve (ROV), and/or a combination valve performing two or more functions. The FLW 80 vents vapor from the fuel tank 54 to the evaporative emissions system 96 via fluid lines 98, 100, 90 and 94. The FLW 80 also closes when a predetermined fuel level in the fuel tank has been reached. The FLW 80 allows fuel tank venting under most conditions other than a predetermined period after refuel shutoff.

The GVV 84 provides venting and/or check valve functions. The venting function is performed during normal vehicle usage or non-aggressive vehicle maneuvers. The check valve function is engaged during aggressive maneuvers or under conditions where the vehicle may come to rest on a surface other than its wheels. In the example in FIG. 1, the FLW 80 and the GW are connected in series to the storage vessel 88.

During operation, the fuel pump 71 of the fuel pump assembly 70 supplies fuel from the primary inlet to the fuel supply system for the engine. While the fuel pump 71 is operating, the vacuum source 73 provides vacuum at the secondary inlet that draws liquid fuel from the storage vessel 88 (if present) via the fluid line 92. The fuel is returned to the fuel tank 54. As a result, the storage vessel 88 is actively drained during operation of the fuel pump 71.

Figure 1B:
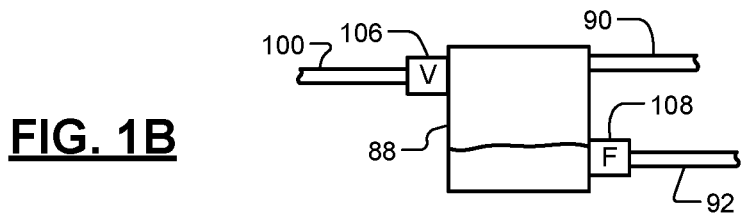
FIG. 1B is a functional block diagram of an example of a storage vessel according to the present disclosure.

Referring now to FIG. 1B, in some examples, the storage vessel 88 includes one or more valves 106 (depending upon whether series or parallel connection is used). In some examples, the one or more valves 106 include a one-way check valve that allows liquid to enter the storage vessel 88 from the one or more vent valves 78. The check valve does not allow liquid to leave the storage vessel 88 due to dynamics, grade or orientation. The storage vessel 88 is connected to the fluid line 92.

In some examples, a filter 108 is connected between the storage vessel 88 and the fluid line 92 to capture debris in the fuel. The fluid line 92 is connected to the vacuum source 73 of the fuel pump 71 in the fuel pump assembly 70. In some examples, the vacuum source 73 corresponds to a Venturi or jet/siphon port on the fuel pump 71. The vacuum source 73 actively purges/transfers the fuel from the storage vessel 88 back into the fuel tank 54. In some examples, the fluid line 92 is arranged spaced from a bottom surface of the storage vessel 88 to allow debris to settle to the bottom surface.

Figure 2:
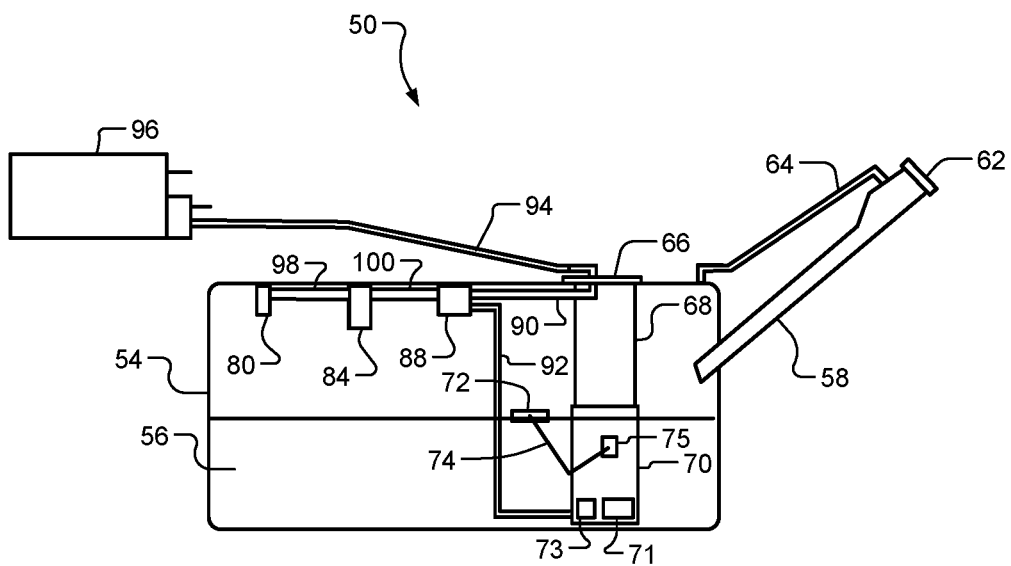
FIG. 2 is a functional block diagram of another example of a fuel tank venting system according to the present disclosure.
Figure 3:
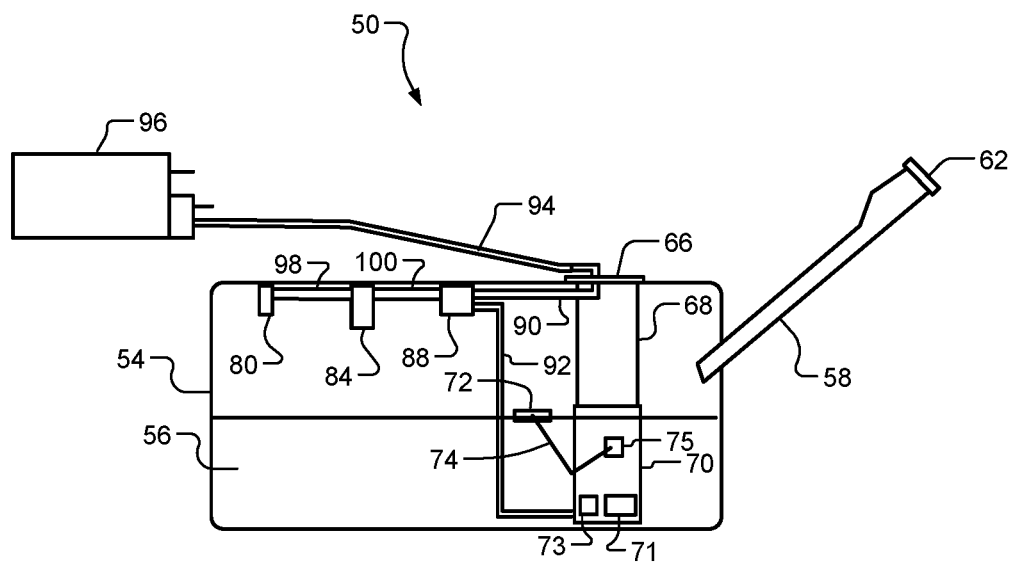
FIG. 3 is a functional block diagram of another example of a fuel tank venting system according to the present disclosure.
Figure 4:
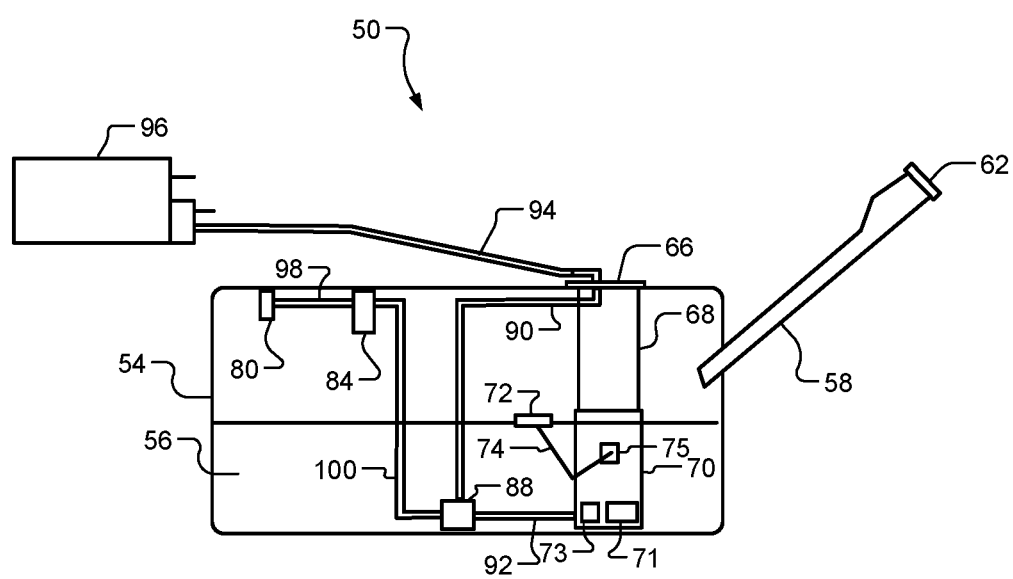
FIG. 4 is a functional block diagram of another example of a fuel tank venting system according to the present disclosure.
Figure 5:
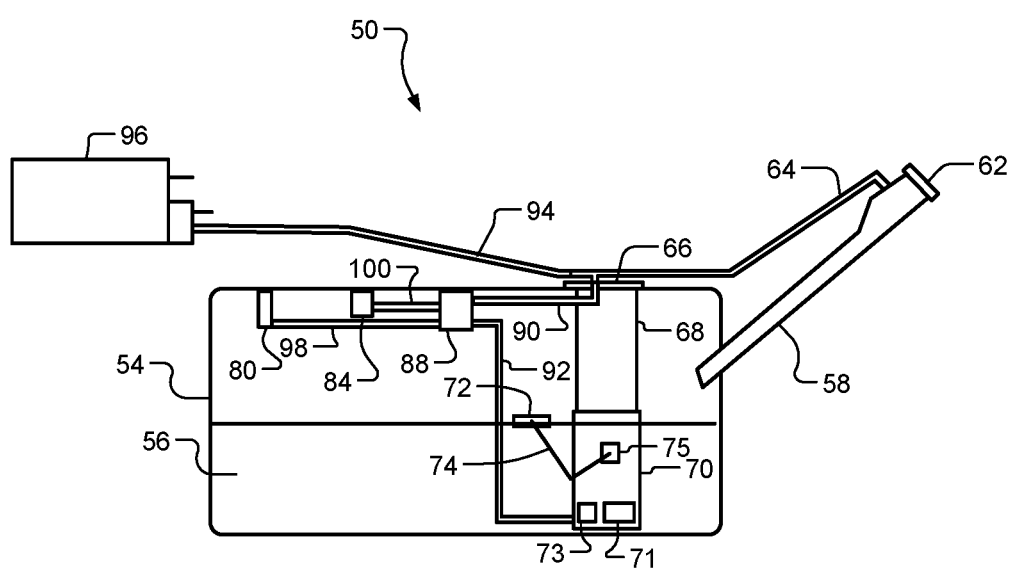
FIG. 5 is a functional block diagram of another example of a fuel tank venting system according to the present disclosure.

Referring now to FIGS. 2-5, non-limiting examples of some of the variations of the fuel tank and fuel tank venting system are shown. In FIG. 2, the fluid line 64 can be connected to the fuel tank 54 at a location other than the flange plate 66. In some examples, the fluid line 64 is connected to the top or side surface of the fuel tank 54. In FIG. 3, the fluid line 64 is omitted. In FIG. 4, the storage vessel 88 is arranged on or near a bottom surface of the fuel tank 54. In FIG. 5, the FLVV 80 and the GW 84 are connected in parallel to the storage vessel 88. The FLVV 80 and the GVV 84 are directly connected by the fluid line 98 and the fluid line 100 to the storage vessel 88.

The fuel tank venting system according to the present disclosure prevents liquid fuel from exiting the fuel tank and entering portions of the evaporative emission system such as the carbon canister. The fuel tank venting system protects the canister from receiving liquid fuel, which improves carbon life and lowers emissions. By preventing liquid fuel from reaching the carbon canisters, fuel and/or over rich fuel vapor is prevented from reaching the engine, which reduces the risk of engine stalls during operation. Reduced rich fuel vapor in the purge stream also enable lower tailpipe emissions and increased fuel economy.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A fuel tank system, comprising:
   a fuel tank;
   a fuel pump assembly arranged in the fuel tank and including a fuel pump and a vacuum source; and
   a fuel tank venting system including:
      a first vent valve arranged in the fuel tank;
      a storage vessel arranged in the fuel tank and in fluid communication with the first vent valve;
      a first fluid line arranged in the fuel tank connecting the storage vessel to the vacuum source of the fuel pump assembly; and
      a second fluid line connecting the storage vessel to an evaporative emission system,
   wherein the fuel tank system further comprises a fuel filter connected between the storage vessel and the vacuum source.

2. The fuel tank system of claim 1, wherein the first vent valve is connected by a third fluid line to the storage vessel.

3. The fuel tank system of claim 1, further comprising a second vent valve arranged in the fuel tank and in fluid communication with the storage vessel.

4. The fuel tank system of claim 3, further comprising:
   a third fluid line connecting the first vent valve to the storage vessel; and
   a fourth fluid line connecting the second vent valve to one of the first vent valve and the storage vessel.

5. The fuel tank system of claim 4, wherein the first vent valve comprises one of a fuel limit vent valve and a grade vent valve.

6. The fuel tank system of claim 4, wherein the first vent valve comprises a grade vent valve and the second vent valve comprises a fuel limit vent valve.

7. The fuel tank system of claim 4, wherein the first vent valve and the second vent valve are connected in series to the storage vessel.

8. The fuel tank system of claim 4, wherein the first vent valve and the second vent valve are connected in parallel to the storage vessel.

9. The fuel tank system of claim 1, wherein the storage vessel is mounted adjacent to an upper surface of the fuel tank.

10. The fuel tank system of claim 1, wherein the storage vessel is mounted adjacent to a lower surface of the fuel tank.

11. The fuel tank system of claim 1, further comprising a one-way check valve connected between the first vent valve and the storage vessel.

12. A fuel tank venting system, comprising:
    a first vent valve arranged in a fuel tank;
    a second vent valve arranged in the fuel tank;
    a storage vessel arranged in the fuel tank and connected in series to the first vent valve and the second vent valve;
    a first fluid line connecting the storage vessel to a vacuum source of a fuel pump assembly; and
    a second fluid line connecting the storage vessel to an evaporative emission system.

13. The fuel tank venting system of claim 12, further comprising:
    a third fluid line connecting the first vent valve to the storage vessel; and
    a fourth fluid line connecting the second vent valve to one of the first vent valve and the storage vessel.

14. The fuel tank venting system of claim 12, wherein the first vent valve comprises a grade vent valve and the second vent valve comprises a fuel limit vent valve.

15. The fuel tank venting system of claim 12, wherein the storage vessel is mounted on or adjacent to an upper surface of the fuel tank and adjacent to a lower surface of the fuel tank.

16. The fuel tank venting system of claim 12, further comprising a one-way check valve connected between the first vent valve and the storage vessel.

17. The fuel tank venting system of claim 12, further comprising a fuel filter connected between the storage vessel and the vacuum source.

18. A fuel tank venting system, comprising:
    a first vent valve arranged in a fuel tank;
    a second vent valve arranged in the fuel tank;
    a storage vessel arranged in the fuel tank and connected in one of series and parallel to the first vent valve and the second vent valve;
    a first fluid line connecting the storage vessel to a vacuum source of a fuel pump assembly;
    a one-way check valve connected between the first vent valve and the storage vessel; and
    a second fluid line connecting the storage vessel to an evaporative emission system.

19. The fuel tank venting system of claim 18, wherein the storage vessel is mounted adjacent to a lower surface of the fuel tank.

20. The fuel tank venting system of claim 18, further comprising a fuel filter connected between the storage vessel and the vacuum source.

* * * * *